(12) United States Patent
Chang

(10) Patent No.: US 6,216,862 B1
(45) Date of Patent: Apr. 17, 2001

(54) COMPACT DISK STORAGE CASE

(76) Inventor: Morgan Chang, 11F, No.4, Sec. 4, Jen Ai Road, Taipei (TW)

(*) Notice: Subject to any disclaimer, the term of this patent is extended or adjusted under 35 U.S.C. 154(b) by 0 days.

(21) Appl. No.: 09/544,449

(22) Filed: Apr. 7, 2000

(51) Int. Cl.$^7$ .................................................. B65D 85/57
(52) U.S. Cl. ....................... 206/308.1; 206/310; 206/493
(58) Field of Search ................. 206/308.1, 309, 206/310, 311, 312, 313, 493, 308.3, 387.1, 387.13

(56) References Cited

U.S. PATENT DOCUMENTS

| | | | |
|---|---|---|---|
| 5,806,672 | * | 9/1998 | Bosworth .......................... 206/308.1 |
| 5,894,924 | * | 4/1999 | Roch ................................. 206/308.1 |
| 6,021,894 | * | 2/2000 | Lakoski et al. ................... 206/308.1 |
| 6,047,821 | * | 4/2000 | Hashimoto et al. .............. 206/308.1 |

* cited by examiner

Primary Examiner—Paul T. Sewell
Assistant Examiner—Shian Luong
(74) Attorney, Agent, or Firm—Rosenberg, Klein & Lee

(57) ABSTRACT

A compact disk storage case is formed integrally by mold injection and mainly comprises a base, a cover connected to the base through a connection band. The base has a projecting inner flange around its perimeter, four clamping bumps arranged in symmetric locations and arranged at center thereof and having arc-shaped outer end. Each clamping bump has a clamping edge on the outer end thereof. The clamping bump has first clamping dots arranged on front and rear sides. The base has two round holes near the connection band and two poles within the holes. The size of the cover is slightly larger than that of the base and has a projecting outer flange, whose side length is s slightly larger than that of the projecting inner flange. The cover has two sets of symmetric clamping poles arranged at center thereof and having second clamping dots on inner ends thereof. Moreover, the cover has two round holes near the connection band 80 and two poles within the holes and with complementary shape with the poles.

2 Claims, 6 Drawing Sheets

COMPACT DISK STORAGE CASE

FIELD OF THE INVENTION

The present invention relates to a compact disk storage case, especially to a compact disk storage case, which has simple structure and stronger locking force to prevent slip of compact disk therein.

BACKGROUND OF THE INVENTION

FIG. 1 shows a perspective view of a conventional compact disk storage case formed integrally by mold injection. The compact disk storage case mainly comprises a base 10, a cover 30 connected to the base 10 through a connection band 20. The base 10 has a projecting outer flange 11 there around, an opening 12 at front center of the projecting outer flange 11, two locking strips 13 on two front lateral sides of the base 10, two positioning posts 14 on inner side of the locking strips 13. The base 10 has a plurality of clamping bumps 15 arranged along a circle at center of the base 10. The cover has projecting inner flange 31 there around, an opening 32 at front center of the projecting inner flange 31, two locking grooves 33 on two front lateral sides of the cover 30. The cover 30 has a plurality of clamping bumps 34 arranged along a circle at center thereof.

FIG. 2 is a sectional view of the conventional compact disk storage case in a locked state. The projecting outer flange 11 is staggered and engaged with the projecting inner flange 31. The locking strips 13 are locked into the locking grooves 33 and retained by the two positioning posts 14. The central opening of compact disk is clamped on the clamping bumps 15 and 34.

However, in above described conventional compact disk storage case, the clamping bumps 15 and 34 are designed to locate on the base 10 and the cover 30, respectively, the structure is complicated.

FIG. 3 shows a perspective view of another conventional compact disk storage case formed integrally by mold injection. The compact disk storage case mainly comprises a base 40, a cover 60 connected to the base 40 through a connection band 50. The base 40 has a dust-proof flange 41 around its perimeter and three clamping strips 42 arranged in circularly symmetric fashion at center of the base 40. Four locking bumps 43 are arranged at inner side of the three clamping strips 42 in also circularly symmetric fashion at center of the base 40. An embedding space 44 is formed between the three clamping strips 42 and the four locking bumps 43. Each locking bump 43 has a locking dot 431 at top outer side. The locking bumps 43 have a cross-shaped space therein and the locking bumps 43 have flexibility to move or shrink. The cover 60 has a dust-proof flange 61 around its perimeter and a hollow locking ring 62 at center thereof The locking ring 62 has a loop of locking rib 621 projecting therefrom.

FIG. 4 is a sectional view of the conventional compact disk storage case in a locked state. The dust-proof flange 61 of the cover 60 is aligned with the dust-proof flange 41 of the base 40. The locking bumps 43 are fit into the locking ring 62 and the locking dots 431 are staggered and locked with the locking rib 621 to achieve the locking of the compact disk storage case.

However, in above described conventional compact disk storage case, the locking dots 431 are staggered and locked with the locking rib 621 to achieve the locking of the compact disk storage case. The locking bumps 43 and the locking dots 431 thereof have limited size to fit into the locking ring 62.

Therefore, the locking force is not sufficient.

It is an object of the present invention to provide a compact disk storage case with enhanced locking force such that the cover thereof will not be opened even though the compact disk storage case is fallen on ground.

It is another object of the present invention to provide a compact disk storage case with simple structure and easy use.

The various objects and advantages of the present invention will be more readily understood from the following detailed description when read in conjunction with the appended drawing, in which:

DETAILED DESCRIPTION OF THE PREFERRED EMBODIMENT

Figure 1:
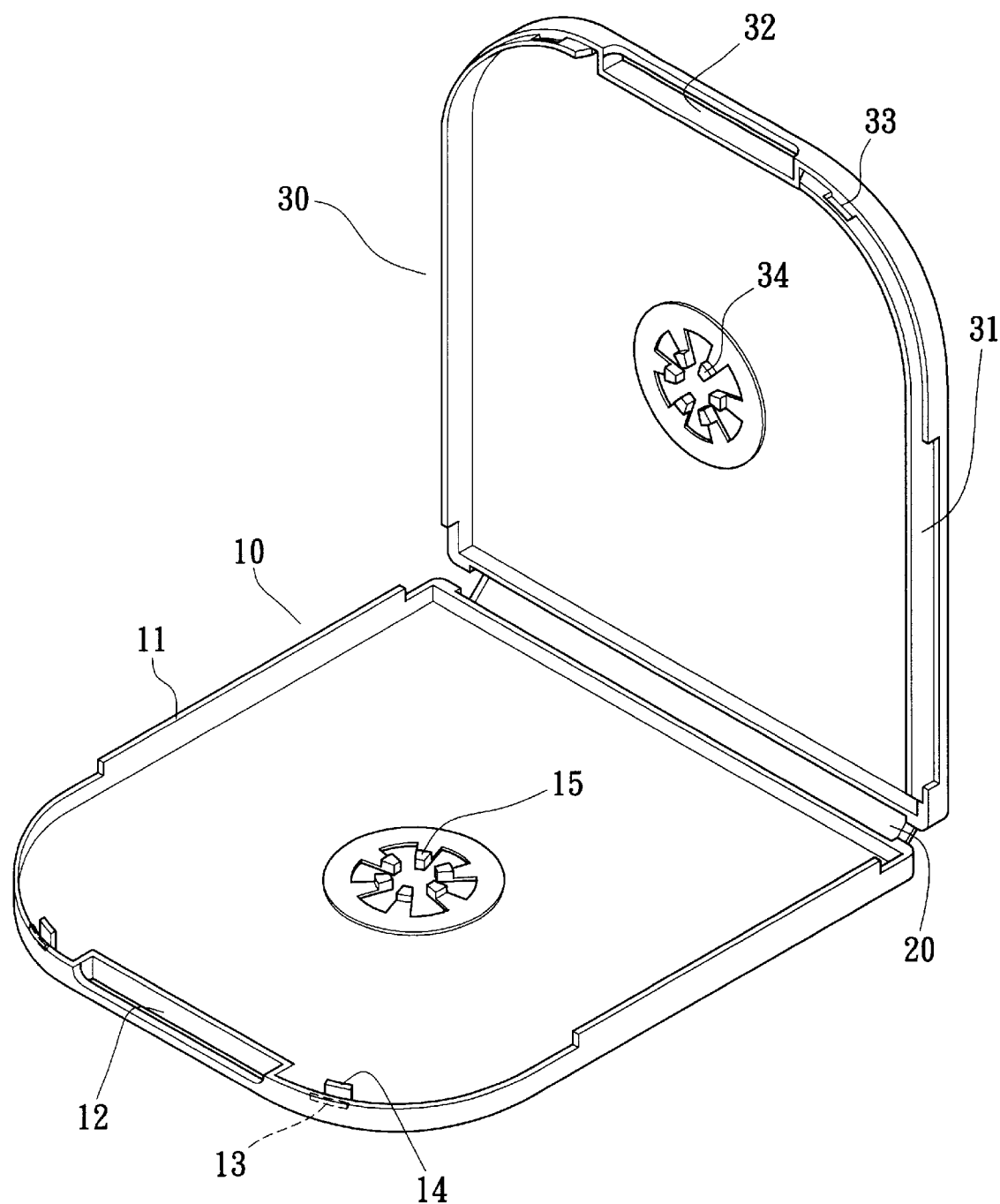
FIG. 1 is a perspective view of a conventional compact disk storage case.
Figure 3:
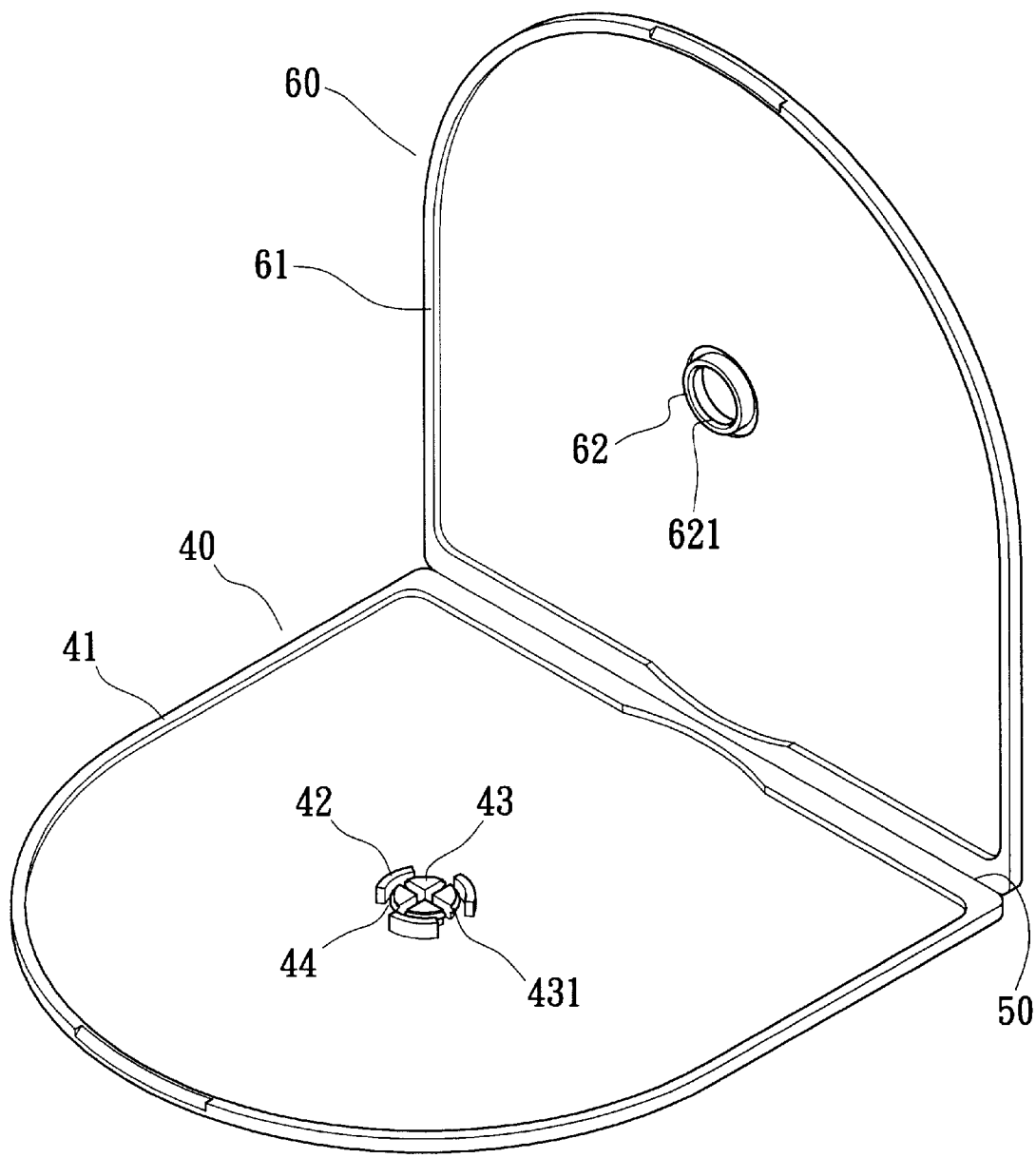
FIG. 3 is a perspective view of another conventional compact disk storage case.
Figure 2:
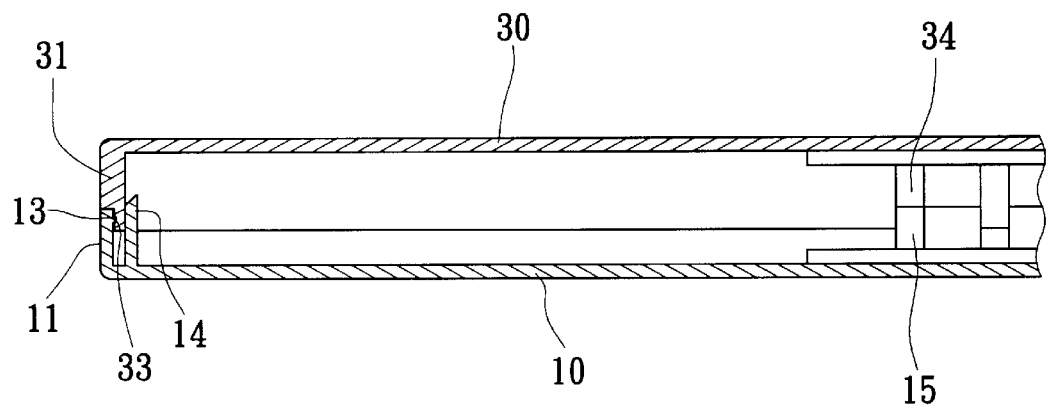
FIG. 2 is a sectional view of a conventional compact disk storage case in a locked state.
Figure 4:
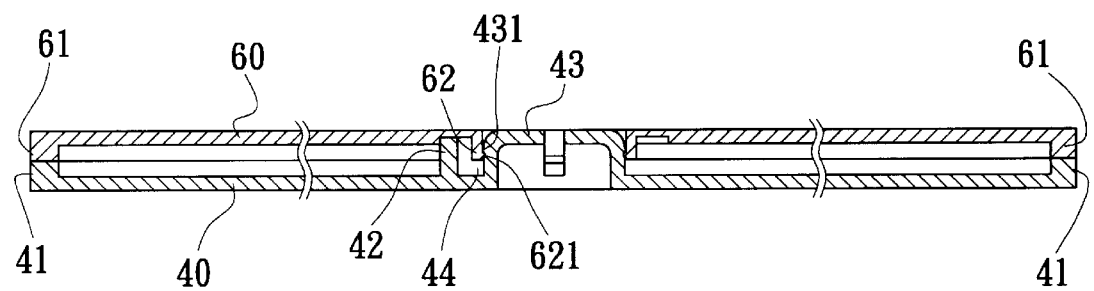
FIG. 4 is a sectional view of another conventional compact disk storage case in a locked state.
Figure 5:
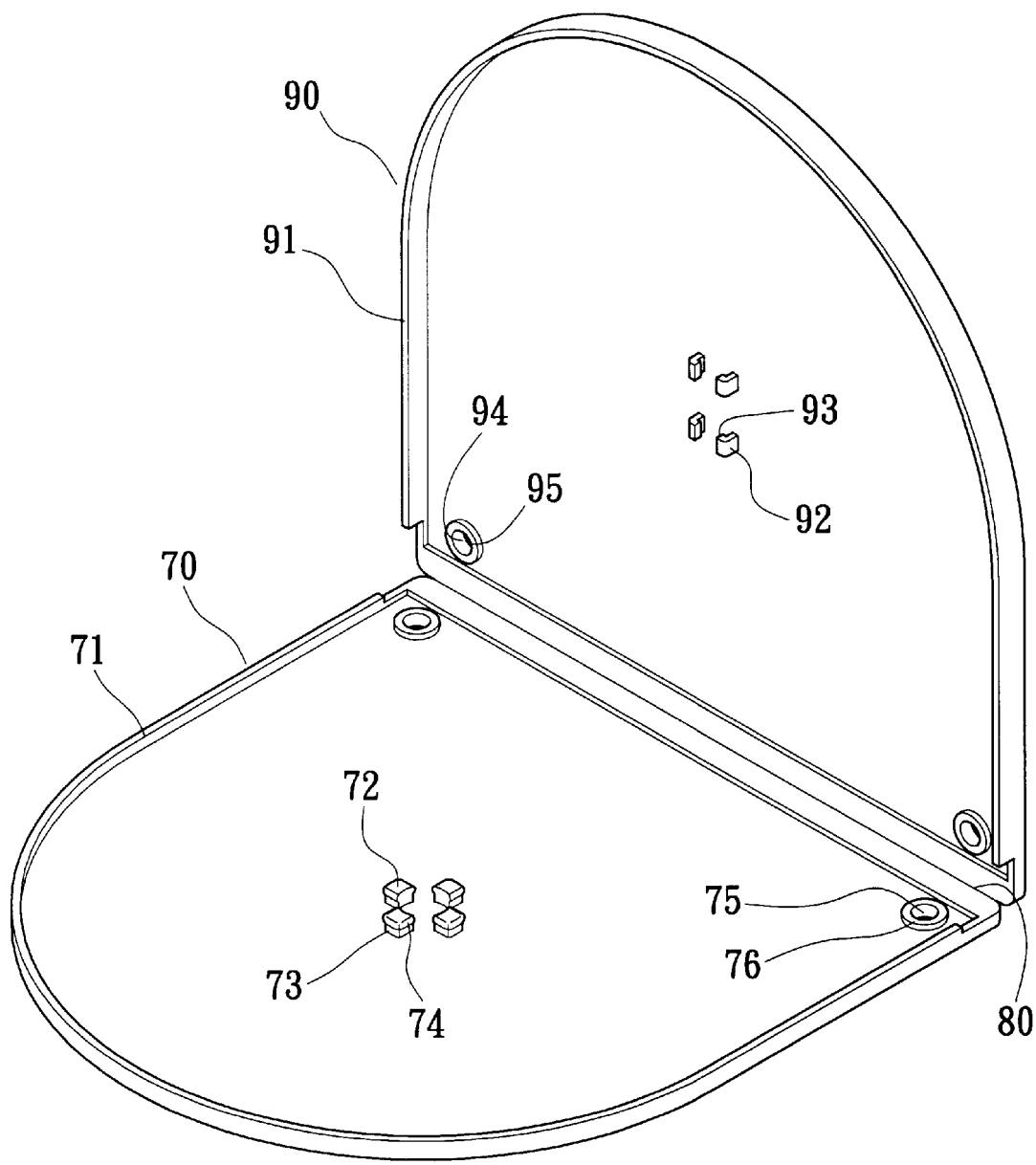
FIG. 5 shows a perspective view of the compact disk storage case according to the prevent invention.

FIG. 5 shows a perspective view of the compact disk storage case according to the prevent invention. The inventive compact disk storage case is formed integrally by mold injection. The compact disk storage case mainly comprises a base 70, a cover 90 connected to the base 70 through a connection band 80.

The base 70 has a projecting inner flange 71 there around, four clamping bumps 72 arranged in symmetric locations at center of the base 70 and having arc-shaped outer end. Each clamping bump 72 has a clamping edge 73 on the outer end thereof. The clamping edge 73 is used to clamp the compact disk mounted on the clamping bumps 72. The clamping bump 72 has two smooth lateral sides and first clamping dots 74 arranged on front and rear sides. The base 70 has two round holes 75 near the connection band 80 and two poles 76 within the holes 75. The size of the cover 90 is slightly larger than that of the base 70 and has a projecting outer flange 91, whose side length is slightly larger than that of the projecting inner flange 71. The cover 90 has two sets of symmetric clamping poles 92 arranged at center thereof and having second clamping dots 93 on inner ends thereof. Moreover, the cover 90 has two round holes 94 near the connection band 80 and two poles 95 within the holes 94 and with complementary shape with the poles 76.

Figure 6:
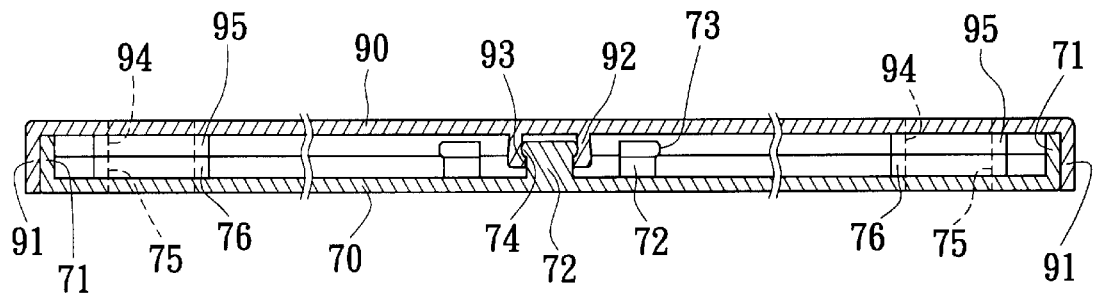
FIG. 6 shows a sectional view of the inventive compact disk storage case in a closed state.
Figure 7:
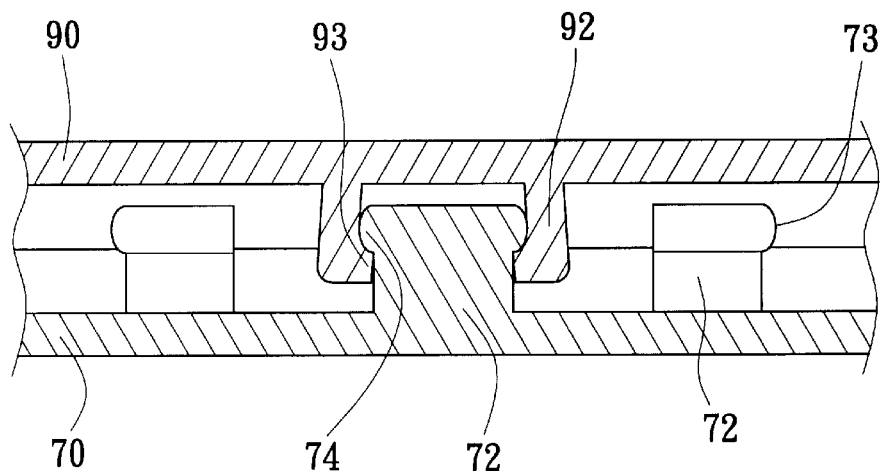
FIG. 7 shows a partially enlarged sectional view of the inventive compact disk storage case in a closed state.
Figure 8:
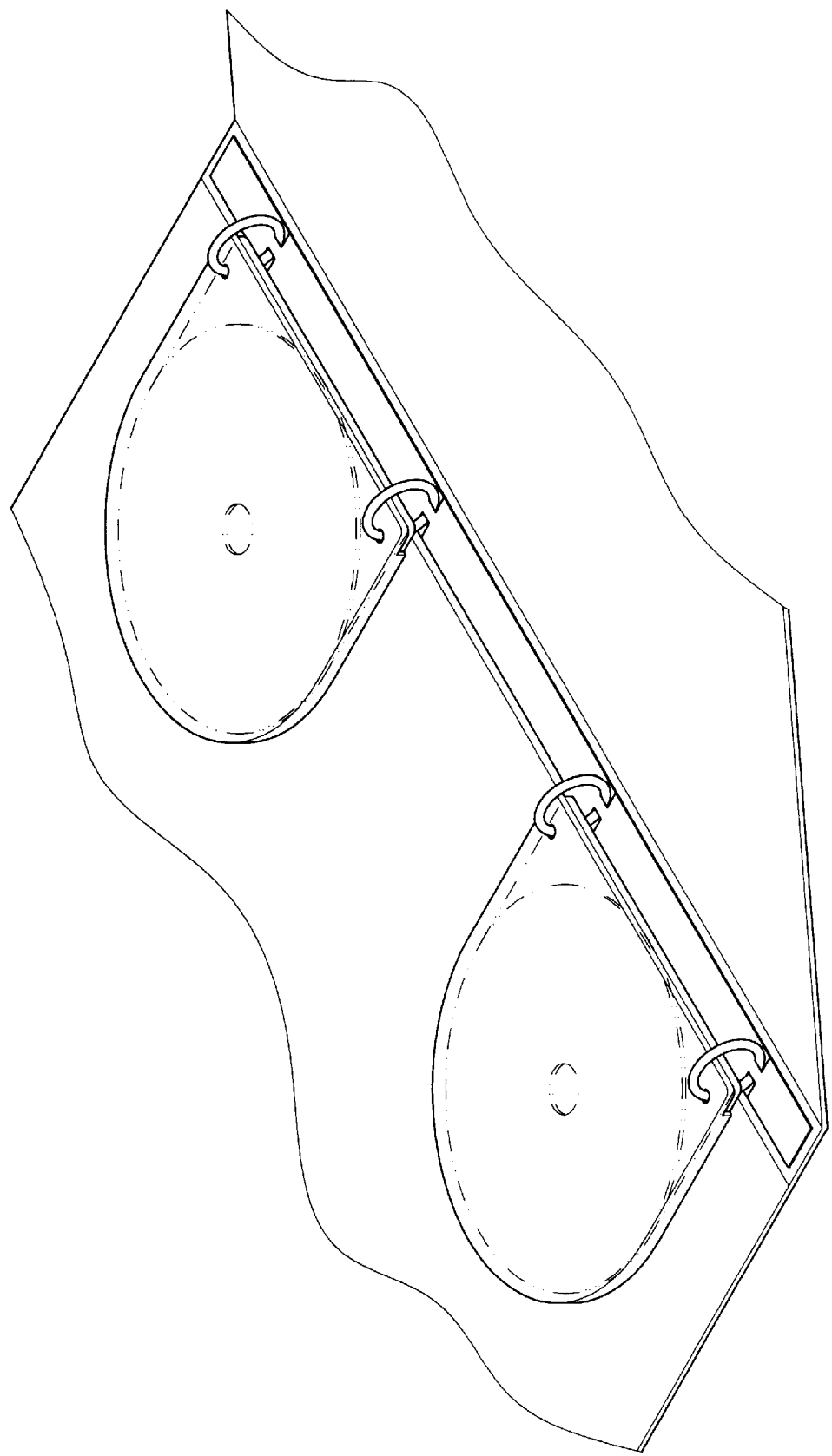
FIG. 8 shows a schematic view of the inventive compact disk storage case in an application.

FIG. 6 shows a sectional view and FIG. 7 shows an enlarged sectional view f the inventive compact disk storage case in a closed state. The cover 90 is rotated to cover the base 70 along the connection band 80. The projecting outer flange 91 of the cover 90 encloses an outer portion of the projecting inner flange 71. The two sets of symmetric clamping poles 92 are abutted on outer side of the clamping bumps 72. The clamping poles 92 are repelled by the clamping bumps 72 with restoring force. The first clamping dots 74 are staggered with the second clamping dots 93 and the poles 76 on the base 70 are engaged with the poles 95 such that the two holes 75 and 94 are aligned vertically. As shown in FIG. 8, the holes 75 and 94 are opened through the case such that a plurality of storage cases can be hooked by hooks of file clip through the holes 75 and 94 thereof.

To sum up, in the inventive compact disk storage case, the cover 90 and the base 70 are locked by the staggered first clamping dots 74 and the second clamping dots 93. The clamping poles 92 are repelled by the clamping bumps 72 with restoring force to enhance the locking force. The inventive compact disk storage case has firmer locking effect.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A compact disk storage case formed integrally by mold injection; the compact disk storage case mainly comprising a base, a cover connected to the base through a connection band;

the base having a projecting inner flange around the perimeter thereof, a plurality of clamping bumps arranged in symmetric locations at center thereof and having arc-shaped outer end; each clamping bump having a clamping edge on the outer end thereof; the size of the cover being slightly larger than that of the base and has a projecting outer flange around the perimeter thereof;

each clamping bump having two smooth lateral sides and a plurality of first clamping dots arranged on front and rear sides; the base having two round holes near the connection band and two poles within the holes; the cover having two sets of symmetric clamping poles arranged at center thereof and having second clamping dots on inner ends thereof; the cover having two round holes near the connection band and two poles within the holes and with complementary shape with the poles.

2. The compact disk storage case as in claim 1, when the cover is covered on the base; the poles of the cover are engaged tightly with the poles of the base and the holes of the cover and base are opened through the compact disk storage case.

* * * * *